United States Patent Office 3,399,132
Patented Aug. 27, 1968

3,399,132
HYDROCRACKING OF HYDROCARBONS WITH A CATALYST COMPOSITE COMPRISING NICKEL AND TIN ASSOCIATED WITH A POROUS ACIDIC INORGANIC OXIDE CARRIER
Bernard F. Mulaskey, Pinole, Calif., assignor to Chevron Research Company, San Francisco, Calif., a corporation of Delaware
Continuation-in-part of application Ser. No. 568,536, July 28, 1966. This application June 8, 1967, Ser. No. 645,855
17 Claims. (Cl. 208—111)

ABSTRACT OF THE DISCLOSURE

A novel catalyst composition of nickel, or compounds of nickel, and tin, or compounds of tin, composited with a porous inorganic oxide carrier, and converting hydrocarbons in the presence of hydrogen with the catalyst.

CROSS-REFERENCE

Figure 1:
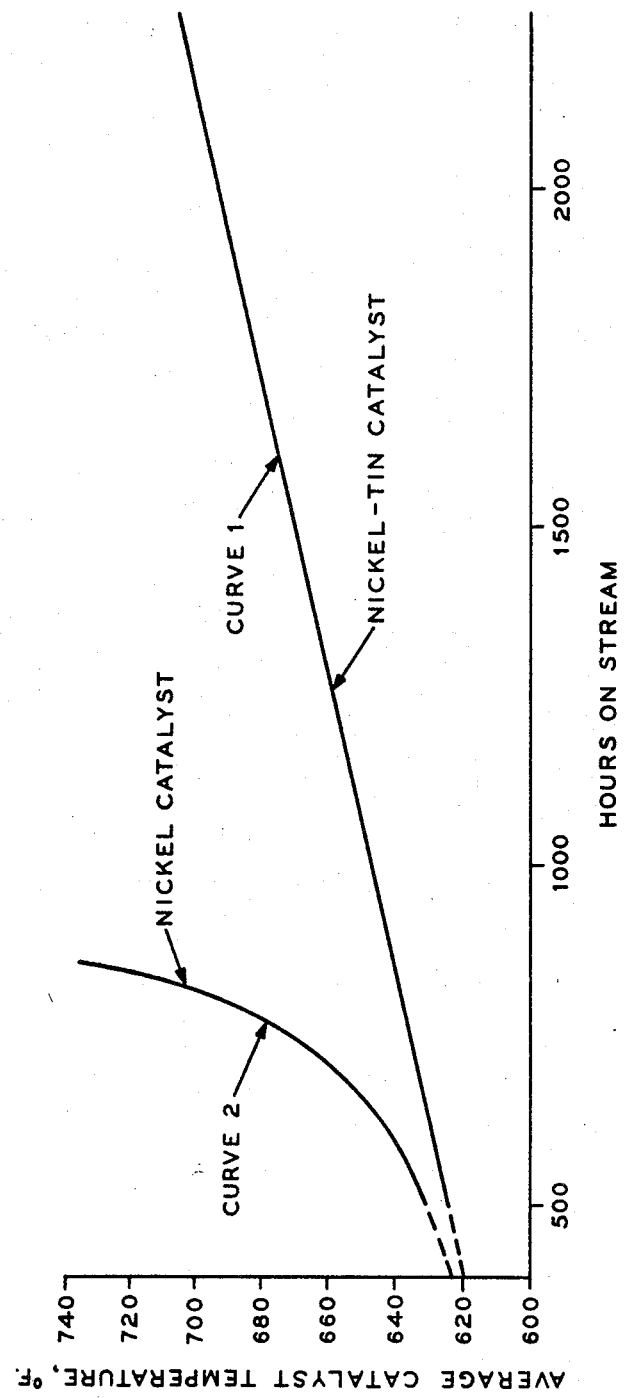

This application is a continuation-in-part of application Ser. No. 568,536, filed July 28, 1966, now abandoned.

The present invention relates to a hydrocarbon hydroconversion process and more particularly to a hydrocracking process. Still more particularly, the present invention is concerned with a novel catalytic composition and to a process for the hydroconversion of hydrocarbons in the presence of the novel catalyst. The novel catalyst comprises both nickel or a nickel compound and tin or a tin compound, associated with a porous inorganic oxide carrier.

Hydrocarbon hydroconversion processes, such as hydrocracking, hydrogenation, hydrofining, and isomerization, are of special importance in the petroleum industry as a means of improving the quality and usefulness of hydrocarbons. Hydroconversion processes refer to those processes wherein hydrogen is added as a necessary feature to the reaction zone; thus, processes which do not require hydrogen, such as catalytic cracking, are not included in the hydroconversion operations of the present invention. The requirement for a diversity of hydrocarbon products, including, for example, high quality gasoline, has led to the development of many catalysts and procedures for converting hydrocarbons in the presence of hydrogen. A particularly important hydrocarbon hydroconversion process is hydrocracking. Although many of the features of the present invention will be discussed only in terms of hydrocracking operations, it is to be understood that the present invention relates to other hydroconversion processes as well.

Catalytic hydrocracking of hydrocarbons is a well-known process in the petroleum industry for converting mixtures of hydrocarbons to lower boiling products in the presence of hydrogen and a catalyst at elevated temperatures and pressures. Two prominent reactions occurring during hydrocracking are cracking and hydrogenation. In general, reaction conditions and catalyst compositions can be varied to manipulate the extent of either reaction. Hydrocracking operations are generally characterized by employing catalysts comprising porous supports, particularly porous inorganic oxide supports, having associated therewith a hydrogenating metal component. Metals which have been suggested in the patent literature as hydrogenating components for hydrocracking catalysts, include, by way of example, the Groups II, IV, VI and VIII metals of the Periodic Table, for example, zinc, mercury, titanium, tin, lead, chromium, molybdenum, tungsten, copper, silver, gold, iron, cobalt, nickel, and the noble metals. Catalysts comprising many of the above metals have been found to possess insufficient hydrogenating and/or cracking activity to be practical for hydrocracking processes. Typical hydrogenating metal components which have found extensive use for hydrocracking are the Group VIII metals, and compounds thereof. In particular, the use of nickel and/or nickel sulfide, disposed on porous inorganic oxide supports, for example, silica-containing supports, as catalysts has been a major development in catalytic hydrocracking. However, means of improving nickel-containing catalysts are continually being sought, and as a consequence many patents have issued in this area.

In accordance with the present invention a new catalytic composition of matter for the hydroconversion of hydrocarbons has been discovered. The new catalytic composition of matter is a hydrocarbon hydroconversion catalyst comprising catalytically active amounts of nickel and tin, or compounds thereof, i.e., nickel or a nickel compound and tin or a tin compound, associated with a porous inorganic oxide carrier. More precisely, the catalyst comprises a porous inorganic oxide carrier and nickel or a nickel compound, and an activity promoting amount of tin or a tin compound. In the absence of nickel, even a large amount of tin is substantially ineffective as a hydrocracking catalyst. In the presence of nickel, even a small amount of tin causes substantial hydrocracking activity improvement, and the amount of nickel used in association with tin to provide an active catalyst can be less than the minimum amount of nickel required to provide an active catalyst without tin. Preferably the novel hydroconversion catalyst comprises nickel and tin, or compounds thereof, in an amount from 2 to 50 combined weight percent metals, with a nickel to tin weight ratio of from 0.25 to 20.

As a specific embodiment of the present invention, the novel catalytic composition of matter comprises a coprecipitated composite of catalytically active amounts of nickel and tin, or compounds thereof, and a porous inorganic oxide. The coprecipitated composite is preferably prepared by the coprecipitation or cogelation of a mixture of compounds of the hydrogenating metals, that is nickel and tin, and compounds of the metals and/or nonmetals whose oxides form the inorganic oxide carrier.

As a further specific embodiment of the present invention, a novel catalytic composition of matter has been discovered comprising a crystalline zeolitic aluminosilicate thoroughly admixed with an amorphous porous inorganic oxide, the mixture containing nickel and tin, or compounds thereof, in an amount from 2 to 50 combined weight percent based on the metals and having a nickel to tin weight ratio from 0.25 to 20. The crystalline zeolitic aluminosilicate preferably has uniform pore dimensions greater than 6 Angstroms.

Moreover, the present invention is based on the discovery that an improved hydrocarbon hydroconversion process can be performed by contacting a hydrocarbon feed under hydrocarbon hydroconversion conditions with a catalyst comprising catalytically active amounts of nickel and tin, or compounds thereof, associated with a porous inorganic oxide. Still more particularly, in accordance with the present invention, hydrocracking of a hydrocarbon feedstock to produce a lower boiling product is accomplished by contacting said feedstock in a reaction zone in the presence of hydrogen with a catalyst comprising catalytically active amounts of nickel and tin, or compounds thereof, and a porous inorganic oxide at hydrocracking conditions. Preferably the catalyst will contain nickel and tin, or compounds thereof, in an amount from 2 to 50 combined weight percent metals and in a ratio based on weight of nickel to tin of from 0.25 to 20.

As a further specific embodiment of the present invention it has been discovered that a process for hydrocracking a hydrocarbon feedstock can be advantageously conducted by contacting said feedstock in the presence of hydrogen at hydrocracking conditions with a catalyst composition comprising a crystalline zeolitic aluminosilicate having pore diameters of at least 6 Angstroms thoroughly admixed with an amorphous porous inorganic oxide and containing from 2 to 50 combined weight percent nickel and tin, or compounds thereof, the nickel to tin weight ratio being from 0.25 to 20.

The presence of tin in a catalyst comprising nickel and a porous inorganic oxide imparts increased hydrogenation activity and cracking activity to the catalytic composition as compared to a catalyst comprising nickel but no tin. Thus, the present catalytic composition provides advantages in hydrocarbon hydroconversion processes wherein increased cracking and hydrogenation activity is desired. Depending on the inorganic oxides selected as the carrier and on the concentration and relative amounts of nickel and tin, or compounds thereof, the extent of hydrogenation compared to cracking can be controlled. Thus, the novel catalytic composition of matter can be utilized in such processes as isomerization, and dehydrogenation wherein cracking is desirably minimized. On the other hand, the present catalytic composition can be used in hydrocracking and in hydrofining operations where cracking is desired. The reason for the increased hydrogenation and cracking activity when tin is associated with a catalyst comprising nickel and a porous inorganic oxide carrier is not understood. It is well known that tin is a poor hydrogenating metal component. Thus, a catalyst comprising only tin on a porous, inorganic oxide carrier is virtually inactive as a hydrocracking catalyst and finds no commercial hydrocracking value.

Also, it has been found that the presence of lead, which is from the same group (Group IVa) of the Periodic Table as tin, in a nickel-containing catalyst does not result in a catalyst having improved cracking and hydrogenating activity when compared with a nickel-containing catalyst having no lead. It has further been found that the presence of a metal such as, for example, manganese, iron, cobalt, copper, zinc, platinum, or palladium in a nickel-containing catalyst either has no noticeable effect on the cracking or hydrogenation activity when compared with a nickel-containing catalyst without such another metal present, or else severely lowers the cracking activity while raising the hydrogenation activity. It is also significant that the presence of tin in a catalyst comprising cobalt associated with a porous inorganic oxide results in a catalyst having no better hydrogenating or cracking activity than a catalyst comprising cobalt without tin. Thus, the combination of nickel and tin, or compounds thereof, with a porous inorganic oxide as a superior hydrocarbon hydroconversion catalyst is unique.

The novel catalytic composition comprising catalytically active amounts of nickel and tin, or compounds thereof, associated with a porous inorganic oxide carrier has other beneficial properties apart from increased hydrogenating and cacking activity when used in the hydrocracking of hydrocarbons. For example, the novel catalytic composition is found to have an exceedingly low fouling rate when employed in a hydrocracking process; that is, the increase in temperature in the reaction zone necessary to maintain a constant conversion of the hydrocarbon feed to lower boiling products is significantly lower than with a catalyst comprising nickel but without tin. In addition it is found that the exceedingly low fouling rate of the novel catalyst is extended to much higher reaction temperatures without acceleration of the fouling rate. Thus, the overall life of the catalyst is significantly increased; that is, the period of time in which the catalyst can be used for hydrocracking before the hydrocracking activity decreases to a low level such that the hydrocracking process must be discontinued to allow for reactivation of the catalyst is increased as a result of the presence of tin in the nickel-containing catalyst.

It has also been found that during hydrocracking the novel catalytic composition of the present invention is remarkably sensitive to the presence of sulfur in the reaction zone in respect to the aromaticity of the product. Moreover, this sensitivity or selectivity is reversible. It had previously been believed that only catalysts comprising the noble metals, particularly platinum and palladium, displayed significant reversible selectively to product aromaticity as a function of sulfur concentration in the reaction mixture. In fact it is disclosed in U.S. Patent 3,132,090 that the reversible sensitivity to sulfur concentration is not displayed to any significant extent by a hydrocracking catalyst wherein the hydrogenating metal component comprises nickel. Thus, it is surprising that the presence of tin in a catalyst comprising nickel and a porous inorganic oxide imparts to the catalytic composition a characteristic previously believed to exist only with the noble metal containing catalysts. Other advantages and benefits derived from the use of the novel catalytic composition of the present invention for hydrocarbon hydroconversions, and in particular hydrocracking, will be more fully elaborated on hereinafter.

The present invention can be better understood and will be further explained hereinafter with reference to the graphs in FIGURES 1 and 2. FIGURE 1 shows for comparison purposes the average catalyst temperature required to maintain 80 percent conversion of the feed in a hydrocracking process to lower boiling products as a function of hours onstream using a catalyst comprising nickel associated with a porous inorganic oxide (curve 1) and using a catalyst of the present invention comprising nickel and tin associated with a porous inorganic oxide (curve 2). The fouling rate can be obtained from the increase in temperature necessary to maintain the desired conversion level. The superiority of a catalyst comprising nickel and tin, or compounds thereof, for hydrocracking is seen in the lower fouling rate.

Figure 2:
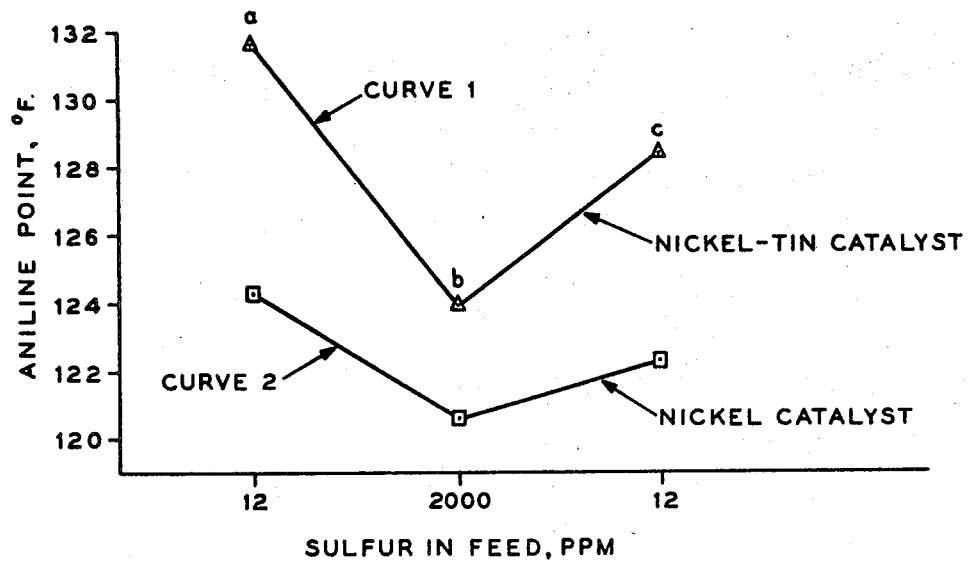

The graph in FIGURE 2 shows for comparison purposes the effect of sulfur addition to the hydrocarbon feed on the aniline point of the product when hydrocracking at a constant conversion of 60 percent to lower boiling products employing a catalyst comprising nickel and tin associated with a porous inorganic oxide (curve 1) and a conventional catalyst comprising nickel associated with a porous inorganic oxide (curve 2). The aniline point is a relative measure of the aromaticity of the product, or, in other words, a measure of the hydrogenation activity of the catalyst. A decrease in the aniline point represents an increase in the product aromaticity. The significant reversible selectivity of the catalyst of the present invention, in respect to product aromaticity, is seen in curve 1 in FIGURE 2. Increasing the sulfur content of the feed from about 12 p.p.m. to about 2000 p.p.m. results in a large increase in the aromatics content of the product. Removing the sulfur from the feed to the previous low level of about 12 p.p.m. reversibly decreases the aromaticity of the product almost to the former low value. Increasing and/or decreasing the sulfur content in the feed in a hydrocracking process using the conventional catalyst containing nickel but no tin does not result in as significant a change in product aromaticity as when using a catalyst of the present invention.

The carrier or support which is used for purposes of the present invention comprises a porous inorganic oxide. By "porous" inorganic oxide is meant the inorganic oxides which have a high surface area, i.e., greater than 50 $m.^2/gm.$, and preferably greater than 150 $m.^2/gm$. Generally, the porous inorganic oxides which are useful as catalyst supports for the present invention have surface areas from about 50 to 700 $m.^2/gm$. Suitable inorganic oxides which can be used in accordance with the present invention include the oxides of the metals and nonmetals of Groups II through VI of the Periodic Table. Natural or synthetically produced inorganic oxides, or combinations thereof, can be used. Thus, for example, suitable inorganic oxides include silica, alumina, magnesia, titania, zirconia and combinations thereof. Generally, it is preferable to employ at least one porous inorganic oxide which is acidic in nature. Typical porous acidic inorganic oxides are the acid-treated clays and silica containing mixed oxides. For hydrocracking processes, it is generally preferable that the carrier comprises a siliceous oxide. Thus, suitable catalysts comprising siliceous oxides include, by way of example, silica-alumina, silica-magnesia, silica-zirconia, silica-magnesia-titania, and silica-alumina-zirconia. Particularly preferred catalysts are the silica-aluminas, particularly silica-aluminas having silica contents in the range of 30 to 99 weight percent.

Other suitable carrier materials for the purposes of the present invention include the crystalline zeolitic aluminosilicates. Both the natural and synthetic crystalline zeolitic aluminosilicates can be used. Crystalline zeolitic aluminosilicates, often referred to as zeolites, comprise aluminosilicate cage structures in which alumina and silica tetrahedra are intimately connected with each other in an open three-dimensional network. The tetrahedra are cross-linked by the sharing of oxygen atoms. In general, the spaces between the tetrahedra are occupied by water molecules prior to dehydration. Dehydration results in crystals interlaced with channels or pores of molecular dimensions, which channels or pores selectively limit the size and shape of foreign substances that can be adsorbed. Thus, the crystalline zeolitic aluminosilicates are often referred to as molecular sieves. In general, the crystalline zeolitic aluminosilicates have exchangeable zeolitic cations associated with the silica-alumina tetrahedra which balance the negative electrovalence of the tetrahedra. The cations may be any number of ions such as, for example, the alkali metal ions, the alkaline earth ions, and the rare earth ions. The cations may be mono-, di-, and trivalent. In general the preferred forms are those wherein the exchangeable zeolitic cations are divalent metals, and/or hydrogen. Normally the zeolites are prepared first in the sodium or potassium form, after which the monovalent cations are ion-exchanged out with desired divalent metal cations, such as calcium, magnesium or manganese cations, or where the hydrogen form is desired, with ammonium cations followed by heating to decompose the ammonium cations to leave hydrogen ions. The hydrogen form is often referred to as decationized.

The crystalline zeolitic aluminosilicates possess relatively well-defined pore structures. For purposes of the present invention, it is preferred that the pore structure of the crystalline zeolitic aluminosilicates comprise openings characterized by pore diameters greater than 6 A. and particularly uniform pore diameters of approximately 6–15 A. The uniform pore structure wherein the pores are greater than 6 A. permit hydrocarbons access to the catalyst. Generally, zeolites which find use for purposes of the present invention have silica/alumina ratios in the crystalline form greater than about 2. Examples of appropriate crystalline zeolitic aluminosilicates are the natural faujasites, synthesized zeolite X disclosed in U.S. Patent 2,882,244, zeolite Y disclosed in U.S. Patent 3,130,007, zeolite L disclosed in U.S. Patent 3,216,789, and decationized zeolite Y described in U.S. Patent 3,130,006.

The catalytic composition of the present invention comprises nickel and tin, or compounds thereof, preferably present in an amount from 2 to 50 combined weight percent metals. That is, regardless of the form in which nickel and tin exist in the catalyst, whether as metallic nickel and tin, or as compounds, such as the oxides or sulfides, the total combined weight percent of nickel and tin in the catalyst, calculated as the metals, should be from 2 to 50. A catalyst containing less than 2 weight percent hydrogenating metals content is too low in hydrogenating activity to be useful, for example, in hydrocracking of hydrocarbons; rather, hydrocracking with such a catalyst results in the production of excessive coke which results in rapid deactivation of the catalyst. Catalyst compositions comprising total hydrogenating metal contents in excess of 50 weight percent can be prepared and employed in hydrocarbon hydroconversion processes. Generally, however, it is not advantageous to exceed 50 weight percent hydrogenating metal content in a catalyst because of the high cost of the hydrogenating metal components and also because high hydrogenating metal content severely limits the amount of the porous inorganic oxide. Preferably, catalysts of the present invention comprise nickel and tin, or compounds thereof, in an amount from 5 to 30 combined weight percent and still more preferably from 7 to 25.

The nickel and tin, or compounds thereof, should be present in the catalyst in a weight ratio of nickel to tin of from 0.25 to 20, determined as the metals. Preferably, the nickel to tin weight ratio is from 0.5 to 20 and most preferably, 0.5 to 10. In general, when employing high combined weights of nickel and tin, it is preferred to use high nickel to tin weight ratios.

The hydrogenating metals, that is nickel and tin, can be in the metallic form, or in compound form, such as, for example, the oxide or sulfide form. The sulfide form of the metals is the preferred compound form for purposes of the present invention. However, any compounds of the metals which perform as hydrogenating components can be used in the catalyst.

The catalytic composition of the present invention can be prepared by any of the conventional methods for associating catalytically active amounts of hydrogenating metal components with a carrier. Thus, the nickel and tin components may be associated with a porous inorganic oxide by impregnation or by ion-exchange. Impregnation is generally accomplished using an aqueous solution of a suitable nickel compound and/or tin compound. Either simultaneous or sequential impregnation of the metal components is suitable. Ion-exchange is generally accomplished by using an aqueous solution of a suitable metal salt wherein the nickel and/or tin is present in the cationic state. As examples, in the preparation of a catalyst wherein the carrier is an amorphous silica-alumina, the nickel and tin are normally associated with the silica-alumina by impregnation. On the other hand, when preparing a catalyst wherein the porous inorganic oxide is a crystalline zeolitic aluminosilicate, the nickel and tin can be associated with the zeolite either by impregnation or ion-exchange. Typical nickel and tin compounds which can be used for impregnation or ion-exchange are the chlorides, nitrates, sulfates, acetates and amine complexes. The tin can be in the stannous or stannic oxidation state.

The novel catalyst of the present invention can be prepared by coprecipitating or cogelling a mixture of compounds of the hydrogenating metals and compounds of the metals and/or nonmetals whose oxides form the inorganic oxide carrier. Both hydrogenating metals can be coprecipitated or cogelled with the compounds of the metals and/or nonmetals whose oxides form the inorganic oxide carrier; or, one of the hydrogenating metals can be associated with the inorgonic oxide carrier by coprecipitation or cogelation, and the other hydrogenating metal then intimately associated with the coprecipitated composite by impregnation or other suitable means. For example, a coprecipitated composite of tin, or compound thereof, and silica-alumina can be prepared by coprecipitating a mixture of stannous chloride, aluminum chloride, an sodium silicate. Nickel, e.g., as nickel chloride, can then be intimately associated with the coprecipitated composite by impregnation.

A preferred method of preparation of the novel catalytic composition of the present invention is by simultaneous coprecipitation or cogelation of a mixture of nickel and tin compounds, and compounds of the metals and/or nonmetals whose oxides form the inorganic oxide carrier. The method of preparation of a coprecipitated composite of only one of the hydrogenating metals and an inorganic oxide is, in general, the same as that for a coprecipitated composite of both metals and an inorganic oxide. For the sake of brevity, the preparation of a coprecipitated composite will be described only in terms of using both hydrogenating metals in the coprecipitated composite. In general, preparation of the coprecipitated composite can be accomplished by forming a solution and/or a sol of the compounds, subsequently precipitating the mixture, preferably at a pH from about 5.5 to 8, by the addition of a precipitating agent, as for example a base, and then washing the coprecipitated composite to remove extraneous materials. Finally, the coprecipitated composite can be dried and then calcined at an elevated temperature. Thus, for example, a coprecipitated composite comprising nickel and tin intimately associated with silica-alumina can be prepared by forming an aqueous solution of aluminum chloride, sodium silicate, nickel chloride and stannous chloride. The solution can then be coprecipitated by the addition of ammonium hydroxide; thereafter the coprecipitated composite can be washed, dried and calcined.

In order to prepare a coprecipitated composite comprising the porous inorganic oxides and nickel and tin components, it is desirable that the starting components be such that when admixed together the resulting mixture will form a solution and/or sol so as to obtain uniform dispersion throughout the mixture.

The compounds in the initial mixture can advantageously be salts such as the nitrates, citrates, formates, alcoxides, and sulfates. Preferably chlorides and acetates are employed. In view of the process advantages of using chloride salts due to their readiness to form solutions with other compounds, their commercial availability and relatively low price, it is often desirable to employ them. The anion content, e.g., chloride, in the final coprecipitate is preferably reduced to below about 0.25 percent of the total weight of the final coprecipitate. Washing with water can often effectively lower the anion content to the desirable limit. If anions are present in the coprecipitate which are difficult to remove by washing, such anions can be ion-exchanged with anions more easily removed by washing. Preferred anions for use in ion-exchange are the bicarbonates, carbonates, acetates, and formates.

For hydrocracking catalysts, it is generally advantageous to have silica present as part of the carrier. Thus, in preparing a coprecipitated composite of catalytically active amounts of nickel and tin, or compounds thereof, and a porous inorganic oxide, it is desirable that a form of silica be present in the mixture of metal and/or nonmetal compounds prior to coprecipitation. It is often desirable to employ silica sols when silica is to be a component of the coprecipitate. In such a case, the silica sol can be made by any conventional procedure. Thus, silica sols can be made by hydrolizing tetraethyl orthosilicate with an aqueous HCl solution. Likewise, silica sols can be prepared by contacting silicon tetrachloride with a cold methanol and water solution or with 95 percent ethyl alcohol, or with cold water or ice. Also silica sols can be made by contacting sodium silicate with an ion-exchange resin to remove the sodium, or by contact with an acid at a pH of about 2.5 or less.

After formation of the initial mixture, it is coprecipitated by conventional techniques. Precipitation is preferably conducted at a pH between about 5.5 and about 8. Thus, the initial mixture, if acidic, can be precipitated by the addition of a base. If the mixture is basic, it can be precipitated with an acid. The precipitation can be stepwise, as by a form of titration, or simultaneous, as by mixing of acidic or basic solutions as the case may be in the proper ratios. It is preferable that the precipitating agent should not introduce any components in the mixture that are deleterious.

Following precipitation of the mixture of compounds, the excess liquid is usually removed by filtration. Thereafter the precipitate is washed and ion-exchanged to remove impurities. Washing is generally conducted in more than one step, using water or dilute aqueous solutions of ammonium salts, e.g., ammonium acetate. The coprecipitated composite is then dried in air or inert gases at a temperature less than 400° F., preferably from about 150°–300° F. The coprecipitate is then calcined, generally at a temperature of from about 750° to 1400° F. in the presence of an oxygen-containing gas.

As mentioned previously, it has been found particularly advantageous to employ a catalyst comprising a crystalline zeolitic aluminosilicate thoroughly admixed with an amorphous porous inorganic oxide, preferably an amorphous siliceous oxide, e.g., silica-alumina, the mixture containing nickel and tin, or compounds thereof. The hydrogenating metals, i.e., nickel and tin, can be associated with the crystalline zeolitic aluminosilicate or with the amorphous porous inorganic oxide. Also, one of the metals, e.g., nickel, can be associated with the crystalline zeolitic aluminosilicate and the other metal, e.g., tin, can be associated with the amorphous porous inorganic oxide. The crystalline zeolitic aluminosilicate can be admixed with the amorphous porous inorganic oxide simply by physically mixing the two components either in the dry state or in the presence of water. In the preparation of a catalytic composition of matter comprising a crystalline zeolitic aluminosilicate thoroughly admixed with an amorphous porous inorganic oxide, and containing nickel and tin, or compounds thereof, the crystalline zeolitic aluminosilicate can be added at any suitable stage of the catalyst preparation. In general, it is preferred that the crystalline zeolitic aluminosilicate be intimately dispersed throughout the amorphous porous inorganic oxide. Preferably, the crystalline zeolitic aluminosilicate is associated with the amorphous component by addition of the crystalline zeolitic aluminosilicate to a mixture, e.g., solution and/or sol, of nickel and tin compounds, and compounds of the metals and/or nonmetals whose oxides form the amorphous porous inorganic oxide during the precipitation of the mixture. It is important that the mixture not be of sufficient acidity to destroy the crystallinity of the zeolite. The zeolite preferably should be present in the final catalytic composition in an amount from 5 to 80 weight percent and more preferably in an amount from 5 to 50 weight percent and most preferably in an amount from 10 to 35 weight percent.

The catalyst of the percent invention can be promoted for hydrocracking activity by the addition of halides. Preferably fluoride is employed. The total fluoride content is preferably associated with the catalyst in an amount from 0.1 to 5 weight percent. The fluoride can be incorporated onto the catalyst at any suitable stage of catalyst manufacture, as, for example, prior to or following incorporation of nickel and tin, or compounds thereof, with the carrier. In general, the fluoride is combined with the catalyst by contacting suitable compounds such as ammonium fluoride or hydrogen fluoride, either in a water-soluble or in gaseous form, with the catalyst. Preferably the fluoride is incorporated onto the catalyst from an aqueous solution containing the fluoride. In the preparation of a coprecipitated composite, the fluoride can be added during the precipitation.

It is generally preferred that the nickel and tin exist in the sulfided form at least during part of the hydrocarbon hydroconversion process. In particular, it is preferred that the catalyst contain at least 0.2 weight percent sulfur. The sulfiding can be accomplished prior to contacting the hydrocarbon feed with the catalyst under hydrocarbon hydroconversion conditions, as by contacting the catalyst comprising nickel and tin, or compounds thereof, with a sulfur-affording gas, for example, hydrogen sulfide, under conditions to result in sulfiding of the hydrogenating metals, i.e., nickel and tin. Other sulfur-affording gases include mixtures of hydrogen and $H_2S$ and mixtures of hydrogen with organic sulfur compounds reducible to $H_2S$ at the sulfiding conditions employed. Generally, the catalyst temperature during sulfiding is controlled below 850° F. and preferably below 750° F. Good results can be obtained by contacting the catalyst with a mixture of hydrogen and vaporized organic compounds of dimethyldisulfide, isopropyl mercaptan, or carbon disulfide at temperatures in the range of 450° to 650° F. It is encompassed as part of the present invention that the catalyst comprising nickel and tin, or compounds thereof, may be contacted with a stream of hydrogen prior to sulfiding.

If it is desired to sulfide the catalytic composition during contact with the hydrocarbon feed, a minor amount of sulfur or sulfur compound, such as dimethyldisulfide or hydrogen sulfide, can be introduced into the hydrocarbon feed stream during the hydroconversion process. Moreover, a hydrocarbon feed stream containing organic sulfur compounds may advantageously be employed. The exact form of sulfur used in the process of the present invention is not critical. Sulfur introduced into the reaction zone can be introduced in any convenient manner and at any convenient location. It can be contained in the fresh liquid hydrocarbon feed, the hydrogen gas, a recycle liquid stream or a recycle gas stream or any combination.

It is encompassed as part of the present invention that the sulfiding can be combined with the hydroconversion process to form an integrated process. For example, a catalyst comprising a porous inorganic oxide and from 2 to 50 combined weight percent nickel and tin, or compounds thereof, with a nickel to tin weight ratio of 0.25 to 20 can be contacted with a sulfur-affording gas under conditions to provide the catalyst with at least 0.2 weight percent sulfur, and then the sulfided catalyst contacted with a hydrocarbon feed in the presence of hydrogen at hydrocracking conditions to produce a lower boiling product.

The form in which the catalyst is used will depend on the type of process involved in the hydroconversion operation, that is, whether the process involves a fixed bed, moving bed, or a fluid operation. Generally, the catalyst will exist in the form of beads, tablets, pellets, spheroidal particles or extruded particles for use in fixed bed or moving bed operations; whereas in a fluidized bed operation, the catalyst will generally exist in a finely-divided or powder form. The catalytic composition can be mixed with a support or binder, if desired, to provide beneficial properties such as increased compactibility or attrition resistance. The particular chemical composition of the support or binder is not critical. It is, however, necessary that the support or binder employed be thermally stable under the conditions at which the hydrocarbon hydroconversion process is carried out.

The novel catalytic composition of the present invention may find utility for various hydrocarbon hydroconversion reactions including hydrofining, hydrogenation, reforming, dealkylation, isomerization and hydrocracking. In particular, the catalytic composition of the present invention is most advantageously used for hydrocracking. Hydrocracking with the novel catalyst results in the production of high quality jet fuel. The hydrocarbon feeds employed and the reaction conditions will depend on the particular hydrocarbon hydroconversion process involved and are generally well known in the petroleum art. Thus, for example, typical feedstocks which can be used for purposes of the present invention include feeds boiling from below about 300° to 1100° F. or higher. Particular feedstocks which may be used include heavy virgin crudes, vacuum distillation residues, catalytic cycle oils, gas oils resulting from the visbreaking of heavy oils, solvent deasphalted oils, and hydrocarbon distillates. These hydrocarbon fractions can be derived from petroleum crude oils, gilsonite, shale oils, tar sand oils, coal hydrogenation and carbonization products and the like.

The conditions of temperature and pressure, hydrogen flow rate and liquid hourly space velocity in the reactor can be correlated and adjusted depending on the particular feedstock utilized, the particular hydrocarbon hydroconversion process, and the products desired. For example, hydrofining operations are generally conducted at a temperature from 500° to 850° F., a pressure within the range 400 to 4000 p.s.i.g., a liquid hourly space velocity (LHSV), i.e., the flow of hydrocarbon feed relative to the catalyst, of from 0.2 to 10, and a hydrogen flow rate above about 500 s.c.f./bbl. of feed.

In general, hydrocracking is accomplished at a temperature from about 450° to 900° F. and a pressure between about 500 to 10,000 p.s.i.g. The higher temperatures and pressures are used with the higher boiling feedstocks. Preferably pressures between 1200 and 6000 p.s.i.g. are used. The hydrogen flow rate into the reactor is maintained between 1,000 to 20,000 s.c.f./bbl. of feed and preferably in the range 4,000 to 10,000 s.c.f./bbl. The hydrogen consumption will vary depending on the properties of the feed and the other hydrocracking conditions used, but there is generally consumed in the hydrocracking zone at least 500 s.c.f./bbl. of hydrogen per barrel of feed. In general, the hydrogen consumption will range from 500 to 5,000 s.c.f./bbl. The excess hydrogen not consumed in the reaction is separated from the treated feed and preferably purified and recycled. The liquid hourly space velocity (LHSV) will generally be in the range from 0.1 to 10 and preferably, 0.3 to 5.

The hydrocarbon feedstock employed in the process of the present invention can contain nitrogen and/or sulfur compounds. It is, however, understood that the feedstock may be hydrofined prior to hydrocracking with the novel catalyst. In a situation where it is desirable to lower the nitrogen and/or sulfur content in the feedstock prior to hydrocracking, accepted levels can be reacted by hydrogenating the feedstock in a hydrofining zone with any suitable hydrofining catalyst. A suitable catalyst for hydrofining is, for example, a silica-alumina support having associated therewith nickel and molybdenum. The nitrogen contained in the feedstock is converted to ammonia and the sulfur is converted to hydrogen sulfide, both of which can be removed prior to hydrocracking by suitable conventional processes.

In accordance with the present invention, it is particularly desirable to control the sulfur content in the feedstock during a hydrocracking process. It has been found, as mentioned earlier, that a catalyst comprising nickel and tin, or compounds thereof, associated with a porous inorganic oxide is reversibly sensitive to sulfur in respect to product aromaticity; that is to say, an increase in sulfur content of the feed will result in an increase in the aromatics content of the product while a decrease in sulfur content in the feedstock will result in a decrease in the aromatics content of the product. Thus, sulfur has been found to affect the hydrogenation activity of the catalyst in a reversible manner. The sulfur level in the feed is preferably regulated in the range from about 10 p.p.m. sulfur to as high as 2000 p.p.m. sulfur but more preferably from 10 to 200 p.p.m. sulfur. It is particularly beneficial that the hydrogenation activity of a catalyst comprising catalytically active amounts of nickel and tin, or compounds thereof, associated with a porous inorganic oxide can be significantly increased or decreased by varying the sulfur content in the feed below 200 p.p.m. sulfur; thus, the reversible selectivity advantage found in the catalyst can be used in existing hydrocracking plants wherein corrosion tolerances limit the amount of sulfur that can be tolerated in the feed to less than 200 p.p.m.

It is necesary that the hydrocarbon feedstock which is subjected to hydrocracking processes wherein the aromaticity of the product is selectively varied or controlled by sulfur addition be substantially aromatic in character, i.e., at least about 10 percent by volume of the feed existing as aromatics. The conditions of temperature and pressure involved in the hydrocracking operation are generally not susceptible to the synthesis of aromatics from nonaromatics. Thus, the reversible selectivity advantage of the catalyst in respect to product aromaticity is conditioned on the ability of the catalyst to hydrogenate aromatics already present in the feed. The temperature utilized during a hydrocracking process wherein the sulfur level is varied to control the aromaticity of the product should preferably be from about 400 to 750° F.

The reversible selectivity for product aromaticity of the catalytic composition of the present invention offers many possible uses for the catalyst. Thus, the catalytic composition can be used in a hydrocracking process to alternately produce a gasoline product when the sulfur content is increased and a high quality jet fuel when the sulfur content is decreased. In particular, it is envisioned that in a hydrocracking process wherein a hydrocarbon feed containing aromatics is contacted with a catalyst comprising catalytically active amounts of nickel and tin, or compounds thereof, and a porous inorganic oxide carrier in the presence of hydrogen and at hydrocracking conditions to produce a lower boiling product, the aromaticity of the product can be controlled and alternatively varied by maintaining a relatively high continuous concentration of sulfur above about 10 p.p.m. sulfur to feed in the hydrocracking zone to produce a relatively aromatic product and maintaining a relatively continuous concentration of sulfur below about 2000 p.p.m. sulfur to feed and preferably below about 200 p.p.m. sulfur in the hydrocracking zone to produce a relatively low aromatic product. It is preferable to employ a porous siliceous oxide as the carrier in the novel catalytic composition, e.g., silica-alumina.

Furthermore, the catalytic composition can be used for hydrocracking a hydrocarbon feed containing aromatics and boiling above the gasoline range to produce a high octane gasoline. The process comprises contacting the hydrocarbon feed in the presence of hydrogen at hydrocracking conditions with the novel catalytic composition of the present invention, while maintaining during said contact a sulfur concentration greater than about 10 p.p.m. sulfur to feed, to produce a product boiling in the gasoline range having a high octane rating.

There are also many other advantages which can be obtained by using the novel catalytic composition in a hydrocracking process. For example, in a hydrocracking process, it may be desirable to maintain a product of constant aromaticity throughout the duration of the operation. However, in general, the product obtained in a hydrocracking process wherein a conventional catalyst is used, e.g., a hydrogenating nickel component associated with silica-alumina, will increase in aromaticity with length of catalyst life, generally as a result of the increase in temperature necessary to maintain desirable conversion levels. Inasmuch as the novel catalytic composition of the present invention is reversibly sensitive to sulfur in respect to product aromaticity, that is, for example, the aromaticity of the product decreases with decrease in sulfur content in the feed, the catalyst can be used in a hydrocracking process to produce a product of relative constant aromatic content. Thus, in a hydrocracking process wherein a hydrocarbon feed containing aromatics and sulfur is contacted at hydrocracking conditions in the presence of hydrogen with a catalyst comprising catalytically active amounts of nickel and tin, or compounds thereof, associated with a porous inorganic oxide, to produce a lower boiling product and the product aromaticity increases with length of catalyst use as a result of loss of hydrogenation activity, the product can be maintained at a relative constant aromatic content by reducing the sulfur content in the feed from its originally high value, e.g., greater than 200 p.p.m., at a rate to compensate for the increase in aromatics due to length of catalyst use.

As a further advantageous feature of the present invention, a hydrocracking process to produce lower boiling products can be conducted under conditions wherein hydrogen consumption is maintained relatively constant throughout the process. Generally, the hydrogen consumption will decrease with length of catalyst service when conventional hydrocracking catalysts are used. Thus, as a feature of the present invention, in a hydrocracking process wherein a hydrocarbon feed containing aromatic hydrocarbons and sulfur is contacted in the presence of hydrogen at hydrocracking conditions with a catalyst comprising catalytically active amounts of nickel and tin, or compounds thereof, associated with a porous inorganic oxide to produce a lower boiling product, the hydrogen consumption during the process can be maintained relatively constant by alternatively increasing or decreasing the sulfur content of said feed at a rate to compensate for any change in hydrogen consumption associated with length of service of said catalyst.

Moreover, the present invention finds use in a two-stage hydrofining-hydrocracking process. In the hydrofining process, wherein a hydrocarbon feed containing aromatics and sulfur is contacted with a conventional hydrofining catalyst in the presence of hydrogen at hydrofining conditions to decompose and remove organic sulfur and nitrogen, the effluent produced generally increases in aromatics with deactivation of the hydrofining catalyst. An increase in aromatics in said effluent, which effluent is subsequently contacted with the hydrocracking catalyst, results in an increase in the fouling rate or deactivation of the hydrocracking catalyst. However, when using the catalyst of the present invention, which comprises catalytically active amounts of nickel and tin, or compounds thereof, associated with a porous inorganic oxide, the hydrogenation activity can be increased by a decrease in the sulfur content in the effluent. The increase in hydrogenation activity counteracts the deactivating effect of increased aromatics in the effluent. Thus, it has been found that the overall length of life of the hydrocracking catalyst can be significantly increased by monitoring the deactivation of said hydrocracking catalyst due to the presence of aromatics, as, for example, by measuring the temperature necessary to produce a certain conversion level, and decreasing the sulfur content in the effluent from the hydrofining zone by adjusting the hydrofining conditions at a rate sufficient to compensate for said deactivation due to aromatics.

Reference has been made, and will be made in even more detail, to catalyst activity which refers to the ability of a catalyst to promote hydrocracking reactions. The activity of any particular catalyst can best be shown by a standard test from which the "activity index" of the catalyst can be determined. A definition and description of "activity index" is found in U.S. Patent 3,243,368. The activity index can be used to effectively compare various catalysts. However, it must be emphasized that the differences in activity indices between catalysts are highly significant and not linear in function. Thus, for example, a two-fold increase in the activity index might actually result in a three-fold increase in conversion to lower boiling products. Hence, what may appear to be a nominal increase in the activity index can be, in fact, one of considerable importance, the difference being not merely one of degree but of kind.

In testing a catalyst to determine its activity index, a hydrocarbon feedstock, along with 12,000 s.c.f. hydrogen per barrel of feed, is passed in contact with the catalyst in a reactor at a liquid hourly space velocity of 2 and at a reactor temperature of 570° F. The reactor temperature is then reduced to 540° F. and the feed passed through for another period of time at the same rate. Samples of the product are collected at about 2 hour intervals during the latter period of time. These samples are allowed to flash off light hydrocarbons at ambient temperature and pressure, following which a determination is made of the API gravity of each sample. The aniline point of the samples may also be determined when it is desired to obtain an indication of the relative tendency of the particular catalyst to hydrogenate aromatics present in the feed. The individual API gravity values are then plotted and a smooth curve is drawn from which an average value can be obtained. Samples collected at the end of the eighth hour of operation at the 540° F. temperature are usually regarded as representative of steady state operating conditions and may be distilled to determine conversion to products boiling below the initial boiling point of the feed. This conversion under steady state test conditions is a true measure of the activity of the catalyst. The difference between the API gravity of the product samples and the API gravity of the feed is a rapid and convenient method of characterizing the catalyst which correlates smoothly with conversion. For convenience, the foregoing change in API gravity of the product from that of the feed is referred to as the activity index of the catalyst.

In measuring the activity indices of particular catalysts for purposes of the present invention a straight-run feedstock, identified as Feed 1 in Table I was passed in contact with the catalyst at 570° F. for 34 hours, whereupon the reactor temperature was lowered to 540° F. and the feed passed through for another 34 hours. Thereafter, the feedstock was changed to a light catalytic cycle oil identified either as Feed 2 or Feed 3 in Table I and passed in contact with the catalyst at 540° F. for 30 hours. During this latter 30 hours, the API gravity of the product was measured every 2 hours, and the activity index determined. In a few instances, the straight-run feedstock (Feed 1) was passed in contact with the catalyst for the latter 30 hours and the API gravity of the product used to determine the activity index.

TABLE I

|  | Feed 1 | Feed 2 | Feed 3 |
|---|---|---|---|
| Gravity, °API | 31.5 | 28.5 | 29.3 |
| Aniline point, °F | 172.6 | 111.6 | 119.4 |
| Nitrogen, p.p.m | 0.44 | 0.55 | 0.14 |
| Aromatics, vol. percent | 10.8 | 35.1 | 29.4 |
| Naphthenes, vol. percent | 72.2 | 51.6 | 59.6 |
| Paraffins, vol. percent | 17.1 | 13.4 | 11.0 |
| Feed distillation range, °F.: |  |  |  |
| Start | 391 | 415 | 406 |
| 5% | 493 | 449 | 438 |
| 10% | 534 | 462 | 453 |
| 30% | 602 | 482 | 480 |
| 50% | 643 | 510 | 511 |
| 70% | 676 | 548 | 557 |
| 90% | 720 | 608 | 624 |
| 95% | 736 | 629 | 658 |
| End Point | 809 | 727 | 719 |

The following examples will more clearly set forth various features of the present invention.

Example 1

A coprecipitated composite comprising at least one hydrogenating metal component, i.e., nickel or tin, or compounds thereof, and silica-alumina can preferably be prepared by precipitating an aqueous solution of glacial acetic acid, a compound of the hydrogenating metal or metals, e.g., nickel chloride or stannous chloride, a compound of aluminum, e.g. aluminum chloride, and a compound of silicon, e.g. sodium silicate, with ammonium hydroxide. The resulting slurry can be filtered, washed, dried and thereafter calcined. If desired the coprecipitated composite can be sulfided.

A catalyst comprising nickel and tin oxides associated with a porous inorganic oxide was prepared by a preferred coprecipitation procedure of the present invention. A solution was prepared by adding 39 grams of $SnCl_2 \cdot 2H_2O$ 1464 grams of an $AlCl_3$ solution containing 117 grams/liter of aluminum, and 335 grams of an $NiCl_2$ solution containing 181 grams/liter of nickel directly to a vessel containing 4 liters of water and 180 ml. of glacial acetic acid. Thereafter 878 grams of commercial sodium silicate (29.6% $SiO_2$ and 9.2% $Na_2O$) dissolved in 3 liters of water were added and the resulting mixture rapidly stirred to form a clear solution and/or sol. The components were then coprecipitated to a final pH of about 7.5 by slowly adding, accompanied by stirring, a solution composed of 750 ml. of 15 M $NH_4OH$ in 2 liters of water. The resulting slurry was then aged for ½ hour at a temperature of 149° F., the pH of the slurry being about 6.5 to 7.5 during the aging period. The slurry was then cooled and filtered to remove excess water and the precipitate recovered. The latter was then sequentially washed four times with a 1 percent aqueous solution of ammonium acetate followed by one wash with distilled water. All washes were conducted at a temperature of about 150° F. and a pH of about 6.5. The precipitate from the last wash was dried for 15 hours at 150° F. and thereafter calcined by contacting with air at a temperature ranging from 400 to 1000° F. for 6 hours, then contacted with dry air at a temperature of 1350° F. for 3 hours. The resulting composite of metal oxides contained 11.2 weight percent nickel oxide and 4.9 weight percent tin oxide, and 83.9 weight percent silica-alumina, the silica to alumina weight ratio being 1.9.

The coprecipitated composite of metal oxides was subsequently sulfided by insertion into a reactor where it was heated at 520° F. and a pressure of about 1200 p.i.s.g. in flowing hydrogen for a period of about 1 hour. The catalyst was substantially sulfided by passing a mixture of dimethyldisulfide and mixed hexanes (the mixture contained 7.3 voulme percent dimethyldisulfide) into the flowing hydrogen. Injection of the sulfiding agent was continued for 1 hour at a temperature of about 540° F. and then discontinued.

The sulfided catalyst was tested for hydrocracking and found to have increased cracking activity and hydrogenation activity as compared to a catalyst comprising nickel without tin.

Example 2

A series of catalysts comprising various concentrations of nickel and tin associated with porous silica-alumina were prepared and sulfided by the method set forth in Example 1. For comparison purposes, catalysts comprising only nickel associated with porous silica-alumina were prepared and sulfided generally as described in Example 1. Furthermore, catalysts comprising various other combinations of hydrogenating metal components were prepared by coprecipitation for comparison purposes. The catalysts were tested for hydrocracking under conditions to permit the determination of the activity indices of the catalysts. The activity indices of the catalysts as well as the amount of hydrogenating metal component in the catalysts are tabulated in Table II. The weight percent hydrogenating metal component is based on the total catalyst composition. The silica to alumina weight ratio in all instances was 1.9. Also shown are the feeds (from Table I) which were used to determine the activity indices.

TABLE II

| Catalyst | Ni (wt. percent) | Sn (wt. percent) | Metal (wt. percent) | Feed | Activity index |
|---|---|---|---|---|---|
| A | 8.8 | 0 |  | 2 | 14.1 |
| B | 8.8 | 4.3 |  | 2 | 29.0 |
| C | 8.1 | 4.5 |  | 2 | 24.3 |
| D | 8.5 | 8.2 |  | 2 | 25.0 |
| E | 8.2 | 2.15 |  | 2 | 20.0 |
| F | 10.0 | 17.6 |  | 1 | 17.5 |
| G | 7.9 | 6.0 |  | 1 | 27.0 |
| H | 10.0 | 1.1 |  | 2 | 23.3 |
| I | 2.5 | 0 |  | 2 | 8.6 |
| J | 2.5 | 1.0 |  | 2 | 11.8 |
| K |  | 8.8 | 10 (Co) | 2 | Nil |
| L | ~8.8 |  | 4 (Zn) | 2 | 12.8 |
| M | ~8.8 |  | 4.7 (Pb) | 2 | 5.2 |
| N | 0 | 9.0 |  | 2 | Nil |

Catalyst A which comprises 8.8 weight percent nickel associated with silica-alumina but contains no tin has an activity index of 14.1. The addition of small amounts of tin to a catalyst significantly increases the activity index. For example, catalyst B comprising 4.3 weight percent tin and 8.8 weight percent nickel has an activity index of 29. Even the presence of 1 weight percent tin a catalyst comprising nickel leads to increased activity over a catalyst having no tin. Compare, for example, the activity indices of catalysts I and J. The catalyst comprising tin as the hydrogenating metal component associated with silica-alumina, that is catlyst N, has virtually a zero activity index. The catalysts containing cobalt and tin (catalyst K); nickel and zinc (catalyst L); and nickel and lead (catalyst M) possess very low activity indices. This strikingly illustrates the uniqueness of the combination of nickel and tin with a porous inorganic oxide support.

Example 3

Catalysts were prepared whereby the hydrogenating nickel and tin components were impregnated onto a porous inorganic oxide. Thus, for example, a catalyst comprising 8 weight percent nickel and 4 weight percent tin, based on the final catalyst composition, was prepared by impregnating a silica-alumina carrier with a nickel chloride and tin chloride solution. Thereafter, the impregnated catalyst was dried, then steam calcined at 800° F. to remove extraneous materials, e.g., chloride, and thereafter calcined in a dry atmosphere. The catalyst was subjected to sulfiding and subsequently tested for hydrocracking activity. Another impregnated catalyst was prepared by impregnating a crystalline zeolitic aluminosilicate (zeolite Y) with a nickel chloride and tin chloride solution. The impregnated zeolite catalyst was dried, calcined and sulfided by conventional processes, and then tested for hydrocracking.

The impregnated catalysts of the present invention were found effective for hydrocracking, although they did not perform as well for hydrocracking as the co-precipitated catalyst of Example 1.

Example 4

A series of catalysts were prepared comprising various concentrations of a crystalline zeolitic aluminosilicate (zeolite Y) thoroughly admixed with amorphous silica-alumina, the composition containing various concentrations of nickel and tin. The catalysts were prepared and sulfided by the procedure generally set forth in Example 1. In the preparation of the catalysts, the zeolite was added to the solution and/or sol of compounds during precipitation. The catalysts were tested for hydrocracking under conditions to permit the determination of the activity indices of the catalysts. The results are tabulated in Table III.

TABLE III

| Catalyst | Ni (wt. percent) | Sn (wt. percent) | Zeolite (wt. percent) | Feed | Activity index |
|---|---|---|---|---|---|
| O | 9.2 | 4.0 | 15 | 3 | 32.2 |
| P | 7.6 | 2.9 | 30 | 3 | 27.0 |
| Q | 9.8 | 8.6 | 30 | 3 | 19.5 |

Example 5

A catalyst comprising 11.1 weight percent nickel, 6.8 weight percent tin, 15 weight percent crystalline zeolitic aluminosilicate (zeolite Y) and the remainder amorphous silica-alumina was prepared and sulfided generally by the procedure outlined in Example 1. The catalyst was fluorided by adding a solution of ammonium fluoride during precipitation of the solution and/or sol. The fluoride content was about 2.8 weight percent. The fluorided catalyst was tested for hydrocracking with Feed 1 of Table I and found to have an activity index of 30.6.

Hydrocracking catalysts comprising nickel disposed on a porous inorganic oxide support have been found to undergo changes during exposure to hydrocarbon feed under hydrocracking conditions. The changes which occur appear to be related to a crystalline growth phenomena of the hydrogenating nickel component of the catalysts. A growth of nickel crystallites apparently leads to catalyst deactivation and furthermore to difficulty of regeneration. Whereas fluoride is often desired in hydrocracking catalysts comprising nickel because of the additional acidity and selectivity which it imparts to the catalysts, fluoride has the undesirable effect of further increasing nickel crystalline growth which leads to increased deactivation of the catalysts. It has been found that the presence of fluoride in a catalyst comprising nickel and tin, or compounds thereof, associated with a porous inorganic oxide does not contribute to the growth of nickel crystallites to any significant extent. Thus, the addition of tin to a catalyst comprising nickel and having minor amounts of fluoride present is considered to have resolved one of the serious problems with fluorided catalysts.

In addition, catalysts comprising nickel and crystalline zeolitic aluminosilicates without tin show increased nickel crystallite growth during hydrocracking. The crystallite growth occurs regardless of the absence of fluoride. This phenomenon has in the past led to the use of other more stable hydrogenating metal components, such as palladium, in zeolite combinations. The catalysts comprising nickel and tin, or compounds thereof, and crystalline zeolitic aluminosilicates do not show growth of nickel crystallites with hydrocracking use.

Example 6

Several catalysts comprising various concentrations of nickel and/or tin associated with a silica-alumina support, and identified in Example 2, were tested for hydrocracking with Feed 2 of Table I, under conditions permitting the determination of activity indices. From the measured conversion of the feed to lower boiling products at 570° F. and 540° F., the temperature required for 60 percent conversion was determined; the aniline point at 60 percent conversion was also determined. The results are presented in Table IV.

TABLE IV

| Catalyst | Ni (wt. percent) | Sn (wt. percent) | 60% conversion | |
|---|---|---|---|---|
| | | | Temp., °F. | Aniline Pt. |
| A | 8.8 | 0 | 578 | 122.2 |
| C | 8.1 | 4.5 | 560 | 128.2 |
| E | 8.2 | 2.15 | 567 | 124.8 |
| N | 0 | 9 | 750+ | 110.5 |

The addition of tin to a catalyst comprising nickel associated with a porous inorganic oxide measurably increases the activity of the catalyst as can be seen from the decrease in the temperature required to obtain 60 percent conversion of the feed to lower boiling products (catalysts C and E) as compared to a catalyst comprising nickel but no tin (catalyst A). Furthermore, the hydrogenation activity of the catalysts comprising nickel and tin are significantly increased over the hydrogenation activity of the catalyst comprising nickel without tin as seen from the increase in aniline points of catalysts C and E over that of catalyst A. An increase in the aniline point is a measure of the increase in the hydrogenation activity of the catalyst.

Example 7

The hydrocracking activity over prolonged periods of time of a catalyst comprising a crystalline zeolitic aluminosilicate thoroughly admixed with an amorphous silica-alumina, and containing catalytically active amounts of nickel and tin (catalyst Q in Table III, Example 4), was compared with the hydrocracking activity of a catalyst comprising nickel associated with a silica-alumina support but containing no tin (catalyst A, Table II, Example 2). The catalysts were prepared and sulfided generally by the method set forth in Example 1. Catalyst Q contained 30 weight percent crystalline zeolitic aluminosilicate, 9.8 weight percent nickel and 8.6 weight percent tin, the remainder being silica-alumina. Catalyst A contained about 8.8 weight percent nickel associated with a silica-alumina carrier. The catalysts were separately contacted with an identical feedstock and hydrogen in a hydrocracking reactor at the same conditions except for temperature. The feed was a hydrofined light catalytic cracking unit cycle oil, identified as Feed 3 of Table I. The reaction conditions included a pressure of 1200 p.s.i.g. and a hydrogen gas rate of 5.600 s.c.f./bbl. feed. The reaction temperature was adjusted in order to maintain throughout the run an 80 percent conversion of the feed to products boiling below the initial boiling point of the feed. The adjustments necessary to be made upon the reaction temperatures give rise to the fouling rate determinations. Thus, as the catalyst becomes deactivated, higher reaction temperatures are necessary in order to maintain the required 80 percent conversion of the feed. The more rapid the rate of temperature increase, the more rapid the rate of undesirable catalyst fouling. Fouling rate can be expressed in terms of temperature and time. Catalyst Q had a fouling rate of about .045° F. per hour which means that the reaction temperature had to be increased about 4.5° F. at 100-hour intervals in order to maintain the 80 percent conversion. Curves 1 and 2 in FIGURE 1 show the comparison of catalysts Q and A with respect to the average catalyst temperatures within the hydrocracking reactor required to maintain an 80 percent conversion as a function of hours onstream of the catalysts. From the figure, it can be seen that the reaction temperature necessary to maintain the desired conversion rose very rapidly for a catalyst comprising nickel but no tin (curve 2) in comparison with that necessary for a catalyst of the present invention (curve 1).

Example 8

Two catalysts were prepared according to the method of Example 1: catalyst Q, identified in Table III, Example 4; and catalyst R, which comprised a crystalline zeolitic aluminosilicate coprecipitated with amorphous silica-alumina and containing 10.3 weight percent nickel but no tin. The zeolite was present in an amount of approximately 30 weight percent. The catalysts were tested for hydrocracking activity by contacting a feed, described as Feed 2 in Table I, with the catalysts at a liquid hourly space velocity of 2, a pressure of 1200 p.s.i.g., and a hydrogen flow rate of 12,000 s.c.f./bbl. of feed. The catalyst temperature was varied in order to maintain 60 percent conversion of the feed to lower boiling products. The feed initially contained 12 p.p.m. sulfur. During the hydrocracking operation, sulfur in the form of dimethyldisulfide was added to the feed to raise the sulfur level of the feed to approximately 2000 p.p.m. Thereafter the sulfur was reduced to the initial level (12 p.p.m. sulfur).

The change in the aniline point of the product from the hydrocracking process at 60 percent conversion as a function of the sulfur content in the feed is shown in FIGURE 2. The aniline point is a relative measure of the aromaticity of the product, or the hydrogenation activity of the catalyst. From curve 1, it is seen that the catalyst of the present invention, catalyst Q, which catalyst comprises nickel and tin, shows a marked decrease in aniline point which corresponds to a marked increase in the aromaticity of the product when the sulfur level in the feed is changed from 12 p.p.m. (point a) to 200 p.p.m. (point b). The reversible selectivity of the catalyst is seen by the significant increase in aniline point upon the removal of sulfur from the feed (point c). On the other hand, the catalyst comprising nickel without tin, catalyst R, displayed very limited selectivity with respect to product aromaticity on the addition and removal of sulfur from the feed. Thus, curve 2 shows a very small change in product aromaticity as the sulfur level in the feed is changed from 12 p.p.m. to 2000 p.p.m. and back to 12 p.p.m.

The foregoing examples involved hydrocarbon feeds containing less than 1 p.p.m. organic nitrogen. The present invention is also applicable using feeds containing at least 10 p.p.m. organic nitrogen.

Example 9

A catalyst comprising nickel and tin, associated with silica-alumina, prepared and sulfided generally as in Example 1 was employed to hydrocrack a hydrocarbon feed boiling between about 359° F. and 781° F., and containing 13 p.p.m. organic nitrogen. The starting temperature, which gives an indication of the activity of the catalyst, was 668° F. as compared to a starting temperature of 699° F. when using a catalyst comprising nickel without tin associated with silica-alumina (prepared generally as in Example 1) to hydrocrack the same feed under the same conditions. Furthermore, the fouling rate of the nickel-tin catalyst was lower than that of the nickel catalyst.

It is evident from the above example that the catalyst of the present invention can be used to hydrocrack nitrogen-containing feeds. While it is preferable to maintain the organic nitrogen content in the feed below about 200 p.p.m., feeds containing higher concentrations of organic nitrogen can also advantageously be hydrocracked using a nickel-tin catalyst. Nitrogen in the form of ammonia can also be present in the feed.

The following example shows the usefulness of the novel catalyst and hydrocracking process of the present invention for the production of high quality jet fuels. Jet fuel fractions generally boil in the range from 300° F. to 530° F., and preferably 320° F. to 500° F.

Example 10

A nickel-tin supported catalyst comprising a coprecipitated composite of nickel, tin, and silica-alumina was used for hydrocracking a hydrocarbon feed to produce a high quality jet fuel fraction. The catalyst contained about 9.1 weight percent nickel and about 3.9 weight percent tin. For comparison purposes, a nickel supported catalyst comprising a coprecipitated composite of nickel and silica-alumina but without tin was used for hydrocracking a similar hydrocarbon feed. The nickel supported catalyst contained about 9.5 weight percent nickel. The feeds used with both catalysts were straight run gas oils boiling within a range from about 500° F. to about 1000° F. The feeds were considered equivalent for test purposes. The reaction conditions included a temperature of 680° F., a pressure of 1900 p.s.i.g., and a liquid hourly space velocity of 1.5.

The nickel-tin supported catalyst produced a 320° F. to 500° F. fraction of improved jet fuel quality as measured by the smoke point. The jet fuel smoke point was 24 mm. as compared to a jet fuel smoke point of 20 mm. for the 320° F.–500° F. jet fuel fraction recovered from the process using the nickel supported catalyst.

Example 11

A catalyst comprising nickel impregnated onto a coprecipitated composite of tin and silica-alumina was prepared and tested for hydrocracking of a light cycle oil feed boiling in the range from 409° to 740° F. The coprecipitated composite was prepared generally by the method of Example 1; that is, an acidic aqueous solution of the compounds, stannous chloride, aluminum chloride, and sodium silicate, was precipitated by adding ammonium hydroxide to the solution; the precipitated slurry was then washed, dried, and calcined. The nickel was impregnated onto the coprecipitated composite from a nickel nitrate solution. The catalyst, comprising about 8 weight percent nickel and about 4.5 weight percent tin, was calcined at 1000° F. and at 1300° F. The hydrocracking process was conducted at a temperature of 540° F., an LHSV of 2 and a pressure of 1200 p.s.i.g. The catalyst was found to have higher hydrogenation activity and hydrocracking activity than a catalyst comprising a coprecipitated composite of nickel and silica-alumina but without tin. Furthermore, the catalyst comprising nickel impregnated onto a coprecipitated composite of tin and silica-alumina was superior in hydrocracking activity to a catalyst comprising both nickel and tin impregnated onto silica-alumina. However, a catalyst comprising a coprecipitated composite of nickel and tin and silica-alumina displayed higher hydrocracking activity than a catalyst comprising nickel impregnated onto a coprecipitated composite of tin and silica-alumina.

It has been observed that, in general, nickel-tin supported catalysts comprising a coprecipitated composite of tin and the porous solid carrier, with the nickel present either by coprecipitation or by impregnation, etc., are superior for hydrocracking reactions to nickel-tin supported catalysts, where, if there is a coprecipitated composite, tin is not part of the coprecipitate. While not intending to limit the scope of the present invention or be bound by any theoretical explanation, it appears that the presence of tin in the coprecipitated composite facilitates the formation of an alloy with the nickel during subsequent high temperature treatment, and that this alloy is at least in part responsible for the superior hydrocracking activity. The alloy is believed to be $Ni_3Sn$. Apparently the alloy forms more readily when both nickel and tin are part of the coprecipitated composite, for catalysts comprising coprecipitated composites of nickel and tin and the porous inorganic oxide are more active for hydrocracking than catalysts comprising nickel impregnated onto a coprecipitated composite of tin and the porous inorganic oxide.

The following example illustrates the advantage of the catalyst of the present invention for the conversion of aromatic hydrocarbons into more saturated hydrocarbons.

Example 12

Two catalysts were prepared generally according to the method of Example 1 and are identified as catalysts A and C in Table II, Example 2. Catalyst A, comprising a coprecipitated composite of nickel and silica-alumina, and catalyst C, comprising a coprecipitated composite of nickel, tin, and silica-alumina, were tested for the hydrogenation of a sulfur-free benzene feed at a temperature of 725° F., a pressure of 1200 p.s.i.a., a liquid hourly space velocity of 3, and a hydrogen to benzene ratio of 10. The catalyst comprising nickel and tin (catalyst C) was far superior in the hydrogenation of benzene than the catalyst comprising nickel without tin (catalyst A). For example, after approximately 20 hours of operation, the process using catalyst C resulted in 98.4 mole percent benzene converted to methylcyclopentane and cyclohexane with only 1.4 mole percent benzene converted to cracked products. On the other hand, the process using catalyst A resulted in only 83.7 mole percent benzene converted to methylcyclopentane and cyclohexane but with 16.2 mole percent benzene converted to cracked products. Thus, the catalyst of the present invention when used for benzene hydrogenation displays high hydrogenation activity and low cracking activity as compared to a catalyst comprising a coprecipitated composite of nickel and silica-alumina but without tin.

Catalysts A and C were also tested for the hydrogenation of a benzene feed containing about 20 p.p.m. sulfur under the same reaction conditions as were used in the tests with the sulfur-free benzene feed. The catalyst comprising nickel and tin (catalyst C) produced a higher concentration of converted products (methylcyclopentane and cyclohexane) over a significantly longer period of time than the catalyst comprising nickel but containing no tin (catalyst A). The sulfur markedly decreased the benzene hydrogenation activity of catalyst A after only about 5 hours onstream time. The benzene hydrogenation activity of catalyst C decreased as a result of the presence of sulfur only after 15 to 20 hours onstream time.

The foregoing disclosure of this invention is not considered to be limiting since variations can be made by those skilled in the art without departing from the scope and spirit of the appended claims.

I claim:
1. A process for hydrocracking a hydrocarbon feedstock which comprises contacting said feedstock in a reaction zone, at hydrocracking conditions in the presence of hydrogen, with a catalyst comprising catalytically active amounts of nickel and tin, or compounds thereof, in an amount from 2 to 50 combined weight percent metals, with a nickel to tin weight ratio of from 0.25 to 20, and a porous acidic inorganic oxide.
2. The process of claim 1 wherein said catalyst contains at least 0.2 weight percent sulfur.
3. The process of claim 1 wherein sulfur is added to said reaction zone during said hydrocracking process.
4. The process of claim 1 wherein said porous inorganic oxide comprises a siliceous oxide.
5. The process of claim 4 wherein said siliceous oxide is silica-alumina.
6. The process of claim 1 wherein said catalyst is promoted with from 0.1 to 5 weight percent fluoride.
7. The process of claim 1 wherein said catalyst contains nickel and tin, or compounds thereof, in an amount from 5 to 30 combined weight percent metal, with a nickel to tin weight ratio of from 0.25 to 20.
8. A process for hydrocracking a hydrocarbon feedstock which comprises contacting said feedstock, in the presence of hydrogen, at hydrocracking conditions, with a catalyst comprising a crystalline zeolitic aluminosilicate having pore diameters of at least 6 A. thoroughly admixed with an amorphous porous inorganic oxide, and containing nickel and tin, or compounds thereof, in an amount from 2 to 50 combined weight percent metals, with a nickel to tin weight ratio of from 0.25 to 20.
9. A process for hydrocracking a hydrocarbon feed which comprises contacting a catalyst comprising nickel and tin, or compounds thereof, and a porous inorganic oxide carrier, said nickel and tin, or compounds thereof, being present in an amount from 2 to 50 combined weight percent metals, with a nickel to tin weight ratio of from 0.25 to 20, with a sulfur-affording gas under conditions to provide the catalyst with at least 0.2 weight percent sulfur, then contacting the sulfided catalyst with said feed in the presence of hydrogen at hydrocracking conditions to produce a lower boiling product.
10. A process which comprises passing a hydrocarbon feed and at least 1000 standard cubic feet of hydrogen-rich gas per barrel of said feed through a reaction zone containing solid particles of a catalyst comprising nickel and tin, or their oxides or sulfides, associated with an acidic porous inorganic oxide carrier comprising from 30 to 99 weight percent silica and from 1 to 70 weight percent alumina, said catalyst containing a total of nickel and tin of from 2 to 50 weight percent, in a ratio of nickel to tin of from 0.25 to 20, with hydrocracking reaction conditions in said reaction zone including a temperature of 450–900° F. and a pressure of at least 500 p.s.i.g., passing said feed at a liquid hourly space velocity of from 0.1 to 10 volumes of said feed per volume of said catalyst per hour.
11. Process according to claim 10 wherein said hydrocarbon feed contains less than 200 p.p.m. organic nitrogen.
12. Process according to claim 11 wherein said hydrocarbon feed comprises a hydrofined oil boiling in a range between 300° F. and 1100° F.
13. Process according to claim 10 wherein said hydrocarbon feed contains less than 10 p.p.m. organic nitrogen.
14. Process according to claim 10 wherein said catalyst was prepared by a method comprising simultaneously coprecipitating or cogelling compounds of nickel, tin, silicon, and aluminum.
15. The process of claim 10 wherein an improved jet fuel fraction boiling in the range from about 300° F. to about 530° F. is recovered from said zone.
16. A process for hydrocracking a hydrocarbon feedstock in a reaction zone, at hydrocracking conditions in the presence of hydrogen, with a catalyst consisting essen- tially of nickel, or the oxides or sulfides thereof, and an activity promoting amount of tin, or the oxides or sulfides thereof, in an amount of from 2 to 50 combined weight percent metals, with a nickel to tin weight ratio of from 0.25 to 20, associated with a porous acidic inorganic oxide carrier.

17. In a process for hydrocracking a hydrocarbon feedstock in a reaction zone at hydrocracking conditions including a temperature of 450–900° F., a pressure of from 1200–6000 p.s.i.g., a liquid hourly space velocity of from 0.1 to 10 volumes of feed per volume of catalyst per hour, and in the presence of at least 1000 standard cubic feet of hydrogen-rich gas per barrel of feed with a catalyst comprising a porous acidic inorganic oxide support having associated therewith catalytically active amounts of nickel, or the oxides or sulfides thereof, the method of decreasing the rate of temperature change in said reaction zone necessary to maintain a constant conversion of the feed to lower boiling products and thereby for significantly increasing the on-stream duration of said hydrocracking process, which comprises using as said catalyst a catalyst containing tin, or the oxides or sulfides thereof, in intimate association with the other components of said catalyst in sufficient amounts that the combined weight percent metals, nickel and tin, is from 5 to 30 weight percent with a nickel to tin weight ratio of from 0.5 to 10, said tin, or the oxides of sulfides thereof, being present as a coprecipitate with said porous acidic inorganic oxide.

References Cited
UNITED STATES PATENTS

| | | | |
|---|---|---|---|
| 2,708,180 | 5/1955 | Von Fuener et al. | 208—111 |
| 2,911,356 | 11/1959 | Hanson | 208—112 |
| 3,073,777 | 1/1963 | Oettinger et al. | 208—111 |
| 3,140,253 | 7/1964 | Plank et al. | 208—120 |
| 3,211,642 | 10/1965 | Unverferth | 208—111 |
| 3,236,761 | 2/1966 | Rabo et al. | 208—111 |

DELBERT E. GANTZ, *Primary Examiner.*

ABRAHAM RIMENS, *Assistant Examiner.*